United States Patent [19]

Hugl et al.

[11] 4,245,995
[45] Jan. 20, 1981

[54] STABILIZATION OF ANIONIC INDOLE DYESTUFFS

[75] Inventors: Herbert Hugl; Hans-Günter Otten; Hans W. Petroll; Karlheinz Wolf, all of Leverkusen, Fed. Rep. of Germany

[73] Assignee: Bayer Aktiengesellschaft, Leverkusen, Fed. Rep. of Germany

[21] Appl. No.: 876,514

[22] Filed: Feb. 9, 1978

[30] Foreign Application Priority Data

Feb. 25, 1977 [DE] Fed. Rep. of Germany ....... 2708188

[51] Int. Cl.³ ...................... D06P 1/645; D06P 1/647
[52] U.S. Cl. .......................................... 8/574; 8/602; 260/208; 260/165
[58] Field of Search .................. 8/87, 85 R; 260/208, 260/165

[56] References Cited

U.S. PATENT DOCUMENTS

| | | | |
|---|---|---|---|
| 2,240,957 | 5/1941 | Munz | 8/85 |
| 2,308,021 | 1/1943 | Munz | 8/87 |
| 2,858,319 | 10/1958 | de Benneville | 8/85 |
| 3,867,369 | 2/1975 | Sommer et al. | 260/165 |
| 3,883,502 | 5/1975 | Sommer et al. | 260/165 |
| 3,891,619 | 6/1975 | Sommer et al. | 260/165 |
| 3,925,350 | 12/1975 | Wolfrum et al. | 260/165 |
| 3,956,267 | 5/1976 | Sommer et al. | 260/165 |

FOREIGN PATENT DOCUMENTS

| | | |
|---|---|---|
| 1316724 | 5/1973 | United Kingdom . |
| 1328774 | 9/1973 | United Kingdom . |
| 1384472 | 2/1975 | United Kingdom . |
| 1430899 | 4/1976 | United Kingdom . |
| 1457231 | 12/1976 | United Kingdom . |

OTHER PUBLICATIONS

Pitts, L. American Dyestuff Reporter (ADR) Oct. 7, 1957 pp. 738-739.
Gard, A. J. ADR Dec. 21, 1953 pp. 867-870.
Zussman, H. W. ADR Jun. 27, 1949 pp. 500-504.
Millson, H. E. ADR Jan. 30, 1956 pp. 66-81.

*Primary Examiner*—Joseph L. Schofer
*Assistant Examiner*—Maria S. Tungol
*Attorney, Agent, or Firm*—Sprung, Felfe, Horn, Lynch & Kramer

[57] ABSTRACT

Azo dyestuffs which contain, as the coupling component an indole of the formula

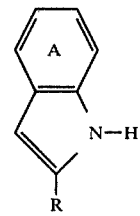

wherein
R denotes an optionally substituted alkyl radical, an optionally substituted aryl radical or an optionally substituted aralkyl radical, and the benzene ring A can be further substituted, frequently exhibit an undesired irreversible change in the color shade in acid solutions, which surprisingly can be prevented by adding nitrogen-containing complex-forming substances.

12 Claims, No Drawings

STABILIZATION OF ANIONIC INDOLE DYESTUFFS

Azo dyestuffs which contain, as the coupling component, an indole of the formula

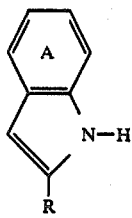

wherein
R denotes an optionally substituted alkyl radical, an optionally substituted aryl radical or an optionally substituted aralkyl radical, and the benzene ring A can be further substituted,
in particular those in which
R denotes a $C_1$-$C_4$-alkyl radical and the benzene ring A is not further substituted or is further substituted by methyl, methoxy, chlorine, bromine or sulpho, frequently exhibit an undesired irreversible change in the colour shade in acid solutions, which noticeably impairs the use of the otherwise very valuable and highly fast dyestuffs.

The adverse effect always occurs, above all, when the dyestuffs are kept for a prolonged period or at elevated temperature in solutions which have been rendered acid, for example dye liquors or printing pastes. This can be the case, for example, in continuous dyeing or in the printing of polyamide carpet materials.

It has now been found that the undesired change in colour shade can be prevented by adding nitrogen-containing complex-forming substances.

Substances which are preferably suitable correspond to the formula

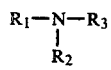

wherein
$R_1$ and $R_2$ denote hydrogen, optionally substituted alkyl, optionally substituted alkenyl, optionally substituted aryl, optionally substituted hetaryl or optionally substituted aralkyl, or together, with the inclusion of the N atom, denote a heterocyclic ring and $R_3$ denotes optionally substituted alkyl, optionally substituted aralkyl, optionally substituted hetaryl or a radical of the formula

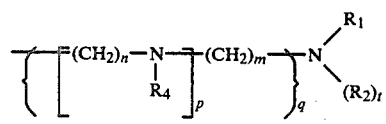

wherein
$R_1$ and $R_2$ have the abovementioned meaning,
$R_4$ denotes hydrogen, optionally substituted alkyl or optionally substituted alkenyl,
n denotes an integer from 1 to 3,
p denotes an integer from 0 to 8,
m denotes an integer from 1 to 4,
q denotes the integer 1 or 2 and
t denotes the integer 0 or 1, the sium of qu and t being 2.

Suitable alkyl radicals R are those with 1 to 4 C atoms, which can be further substituted, for example, by cyano, aminocarbonyl, amino or carboxyl. Possible substituents of the benzene ring A are, in particular, chlorine, bromine, $C_1$-$C_4$-alkyl, $C_1$-$C_4$-alkoxy, cyano or sulpho.

The alkyl and alkenyl radicals $R_1$ to $R_4$ preferably contain 1 to 30 C atoms and can contain, as substituents, hydroxyl, $C_1$-$C_4$-alkoxy, carboxyl or polyether groups of the formula

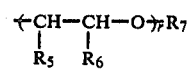

wherein
$R_5$ and $R_6$ denote hydrogen or methyl,
$R_7$ denotes hydrogen or $C_1$-$C_4$-alkyl and
r denotes an integer from 1-40.

Suitable aryl $R_1$, $R_2$ and $R_3$ is, in particular, phenyl which is optionally substituted by halogen, hydroxyl, $C_1$-$C_{12}$-alkyl or $C_1$-$C_{12}$-alkoxy. Suitable aralkyl $R_1$, $R_2$ and $R_3$ is phenyl-$C_1$-$C_4$-alkyl which is optionally substituted in the phenyl nucleus by $C_1$-$C_4$-alkyl, $C_1$-$C_4$-alkoxy or halogen. Suitable hetaryl $R_1$, $R_2$ and $R_3$ is, for example, pyridin-2-yl. Suitable heterocyclic rings, which $R_1$ and $R_2$ can form together, with the inclusion of the N atom, are, for example, morpholine, piperidine and piperazine.

Preferred compounds of the formula (II) are, in particular, nitrilotriacetic acid, ethylenediaminetetraacetic acid, diethylenetriaminepentaacetic acid, triethylenetetramine, tetraethylenepentamine, pentaethylenehexamine and N-(2-aminoethyl)-piperazine.

The stabilising agent is used in an amount of 5 to 50% by weight, preferably 20 to 40% by weight, relative to the weight of the dyestuff. The action of the stabilising agent can be even further increased by also using non-ionic surface-active agents. Examples of these which come are substances of the formula

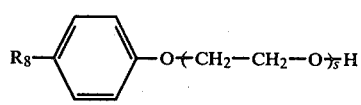

wherein
$R_8$ denotes $C_4$-$C_{12}$-alkyl and
s denotes 10 to 40,
or

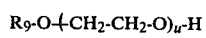

wherein
$R_9$ denotes an optionally unsaturated $C_{12}$-$C_{20}$-alkyl radical and
u denotes 20 to 50.

These surface-active agents are optionally also used in a concentration of 0.3 to 10 g per liter, preferably 0.5 to 3 g per liter. The amount of the dyestuff in the acid solution is 0.02 to 5 g per liter.

The invention further relates to dyestuff formulations which contain 20 to 80% by weight of a dyestuff of the formula

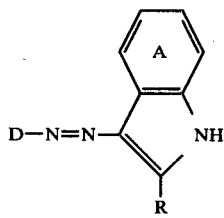
(V)

wherein
D denotes the radical of a diazo component and
A and R have the abovementioned meaning,
D, A and R being chosen so that the dyestuff contains at least one acid group,
5 to 30% by weight of a compound of the formula (II) and 0 to 75% by weight of further customary formulating agents. Customary formulating agents are, for example, inorganic salts, such as NaCl or Na₂SO₄, dextrin, anionic dispersing agents and polyvinyl alcohol.

The process according to the invention is particularly effective in the case of dyestuffs which contain 2-methylindole as coupling components. Nitrilotriacetic acid, ethylene diaminetetraacetic acid and diethylenetriaminepentaacetic acid are particularly suitable additives for such dyestuffs. The compounds can be employed either in the form of the free acid or in the form of their salts, preferably the alkali metal salts.

Dyestuffs of the formula (V) to which the process according to the invention can be applied are known, for example, from British Pat. Specification Nos. 1,316,724, 1,328,774, 1,384,472, 1,430,899 and 1,457,231 and from U.S. Pat. Nos. 3,956,267, 3,883,502, 3,867,369, 3,891,619 and 3,925,350.

The process which follows has proved to be a practicable test method for evaluating and avoiding the undesired colour change:

The dyestuff is kept in an acid solution at pH 4 for 6 hours at 80° C., with and without the addition of the stabilising agent. Dyeings are produced from these solutions on nylon 6 in the customary manner and are compared visually, both with one another and with dyeings which have been obtained in the same manner from freshly prepared solutions. For better differentiation, 0.4%* of C.I. Acid Blue 40 and 0.4%* of C.I. Acid Red 337 are added, in the case of each dyeing, as contrast dyestuffs.

*Commercial strength, relative to the weight of the material

The concentration of the dyestuff investigated is, depending on the dyestuff, up to 1%, relative to the weight of the material. Instead of the dyestuffs and stabilising agents, it is also possible to investigate dyestuff formulations which contain the given stabilising agent or in which the stabilising agent is lacking, and which optionally contain further customary formulating agents.

EXAMPLE 1

0.2 g of the dyestuff of the formula

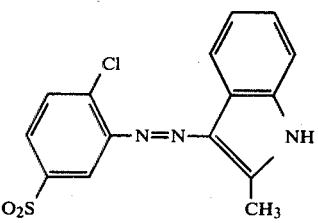

are dissolved in soft water (German hardness=0), together with 0.03 g of the tetrasodium salts of ethylenediaminetetraacetic acid as the stabilising agent. The solution is adjusted to pH 4 with secondary sodium phosphate and acetic acid and is made up to 125 ml with soft water.

The solution is warmed to a temperature of 80° C. for 6 hours. A dyebath is prepared using an appropriate proportion of this solution and the dyestuffs Acid Blue 40 and Acid Red 337, and nylon 6 is dyed with this in the customary manner. The dyebath contains, relative to the weight of the material, 0.4% of Acid Blue 40, 0.3% of Acid Red 337 and 0.4% of the indole dyestuff described above.

A brown dyeing results in which the yellow component appears significantly more strongly than in the case of a comparison dyeing, for the preparation of which the yellow dyestuff was pre-treated in the same manner, but without a stabilising agent.

EXAMPLE 2

Example 1 is repeated, the dyestuff of the formula

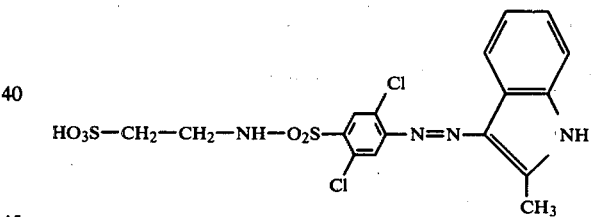

having been employed as the indole dyestuff this time. As in Example 1, a brown dyeing with a significantly stronger yellow component than in the case of a comparison dyeing, for the preparation of which the indole dyestuff was pre-treated without a stabilising agent, results.

EXAMPLE 3

Example 1 is repeated, the dyestuff of the formula

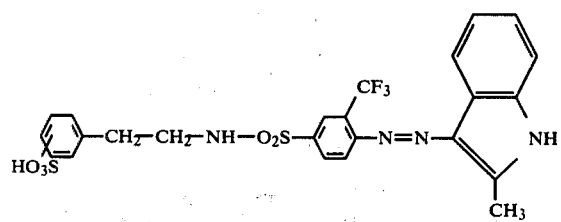

having been employed as the indole dyestuff. In the resulting brown dyeing, the yellow component appears significantly more strongly than in the case of a comparison dyeing which was obtained without the stabilising agent, but otherwise in the same manner.

EXAMPLE 4

Example 1 is repeated, 0.03 g of tetraethylenepentamine together with 0.625 g of the emulsifier of the formula

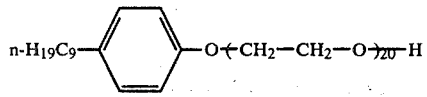

being used as the stabilising agent as the stabilising agent. Compared with Example 1, the stabilisation of the indole dyestuff is improved even further.

Similar results are achieved when the dyestuffs from Examples 2 and 3 are employed in Example 4.

EXAMPLE 5

Example 2 is repeated, 0.3 g of an already stabilised formulation of the same dyestuff, having a composition of 70% by weight of pure dyestuff, 10% by weight of the pentasodium salt of diethylenetriaminepentaacetic acid, 5% by weight of lithium hydroxide and 15% by weight of the sodium salt of the formaldehyde condensate of ditolyl ether-sulphonic acid, being employed instead of the indole dyestuff and the stabilising agent. The comparison result is comparable to the result from Example 2.

We claim:

1. A process for preventing irreversible changes in the color shade of azo dyestuffs which occur in solutions which have been rendered acid which dyestuffs contain, as the coupling component, an indole of the fomula

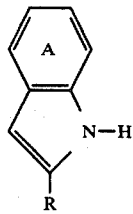

wherein

R denotes an optionally substituted alkyl radical where the substituent is cyano, amino carbonyl, amino or carboxyl, aryl radical or an aralkyl radical and the benzene ring A can be further subsituted by chlorine, bromine, $C_1$ to $C_4$-alkyl, $C_1$ to $C_4$-alkoxy, cyano or sulpho, in acid solution comprising adding a nitrogen-containing complex-forming substance having the formula

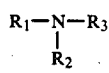

wherein $R_1$ and $R_2$ denote hydrogen, $C_1$-$C_{30}$-alkyl or $C_1$-$C_{30}$-alkenyl which are optionally substituted by hydroxyl, $C_1$-$C_4$-alkoxy, carboxyl or polyether groups of the formula

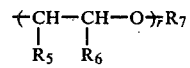

wherein $R_5$ and $R_6$ denote hydrogen or methyl, $R_7$ denotes hydrogen or $C_1$-$C_4$-alkyl and r denotes an integer from 1-40;

phenyl which is optionally substituted by halogen, hydroxyl, $C_1$-$C_{12}$-alkyl or $C_1$-$C_{12}$-alkoxy, pyridin-2-yl or phenyl-$C_1$-$C_4$-alkyl which is optionally substituted one phenyl nucleus by $C_1$-$C_4$-alkyl, $C_1$-$C_4$-alkoxy or halogen, or together denote, with the inclusion of the N atom, morpholinyl, piperidinyl or piperazinyl; and $R_3$ denotes $C_1$-$C_{30}$-alkyl which is optionally substituted by hydroxyl, $C_1$-$C_4$-alkoxy, carboxyl or polyether groups of the formula

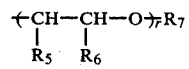

wherein $R_5$ and $R_6$ denote hydrogen or methyl, $R_7$ denotes hydrogen or $C_1$-$C_4$-alkyl and r denotes an integer from 1-40;

phenyl-$C_1$-$C_4$-alkyl which is optionally substituted on the phenyl nucleus by $C_1$-$C_4$-alkyl, $C_1$-$C_4$-alkoxy or halogen, piperidin-2-yl or a radical of the formula

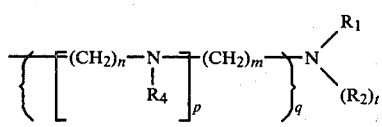

wherein $R_5$ and $R_6$ denote hydrogen or methyl, $R_7$ denotes hydrogen or $C_1$-$C_4$-alkyl and r denotes an integer from 1-40;

substituted $C_1$-$C_{30}$-alkyl or -alkenyl, n denotes an integer from 1 to 3, p denotes an integer from 0 to 8, m denotes an integer from 1 to 4, q denotes the integer 1 or 2 and t denotes the integer 0 or 1, the sum of q and t being 2.

2. Process according to claim 1, wherein nitrilotriacetic acid, ethylenediaminetetraacetic acid, diethylenetriaminepentaacetic acid, triethylenetetramine, tetraethylenepentamine, pentaethylenehexamine and N-(2-aminoethyl)-piperazine are used as the nitrogen-containing complex-forming substances.

3. Process according to claim 1, wherein the nitrogen-containing complex-forming substances are added to those azo dyestuffs which contain, as the coupling component, an indole of the formula

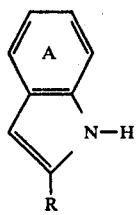

wherein
R denotes $C_1$-$C_4$-alkyl which is optionally substituted by cyano, aminocarbonyl, amino or carboxyl and the benzene ring A is optionally substituted by chlorine, bromine, $C_1$-$C_4$-alkyl, $C_1$-$C_4$-alkoxy, cyano or sulpho.

4. Process according to claim 3, wherein R denotes $C_1$-$C_4$-alkyl and the benzene ring A is not further substituted or is further substituted by methyl, methoxy, chlorine, bromine or sulpho.

5. Process according to claim 1, for preventing irreversible changes in the colour shade of azo dyestuffs, which contain, as the coupling component, 2-methylindole, wherein nitrilotriacetic acid, ethylenediaminetetraacetic acid and diethylenetriaminepentaacetic acid are added as the nitrogen-containing complex-forming substance.

6. Process according to claim 1, wherein the nitrogen-containing complex-forming compounds are added in an amount of 5 to 50% by weight, relative to the weight of the dyestuff.

7. Process according to claim 1, wherein non-ionic surface-active agents are additionally added.

8. Process according to claim 7, wherein the non-ionic surface-active agents are added in an amount of 0.3 to 10 g per liter of the acid solution.

9. Process according to claim 1, wherein surface-active agents of the formula

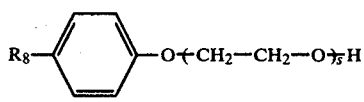

wherein
$R_8$ denotes $C_4$ to $C_{12}$-alkyl and
s denotes a number from 10 to 40, or of the formula

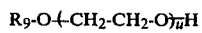

wherein
$R_9$ denotes an optionally unsaturated $C_{12}$ to $C_{20}$-alkyl radical and
u denotes a number from 20 to 50,
are additionally added.

10. Process according to claim 1, wherein those solutions which contain the azo dyestuff in a concentration of 0.02 to 5 g per liter are treated.

11. Dyestuff formulations comprising 20–80 percent by weight of a dyestuff of the formula

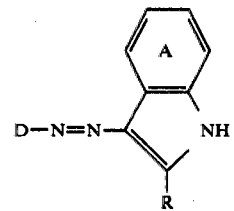

wherein
R denotes an optionally substituted alkyl radical where the substituent is cyano, amino carbonyl, amino or carboxyl, an aryl radical or an aralkyl radical and
the benzene ring A can be further substituted by chlorine bromine, $C_1$-$C_4$-alkyl, $C_1$-$C_4$-alkoxy, cyano or sulfo,
D denotes the radical of a diazo component and
D, A and R are chosen so that the dyestuff contains at least one acid group;
5 to 30% by weight of a nitrogen-containing complex-forming substance having the formula

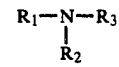

wherein
$R_1$ and $R_2$ denote hydrogen, $C_1$-$C_{30}$-alkyl or $C_1$-$C_{30}$-alkenyl which are optionally substituted by hydroxyl, $C_1$-$C_4$-alkoxy, carboxyl or polyether groups of the formula

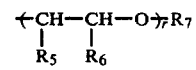

wherein
$R_5$ and $R_6$ denote hydrogen or methyl,
$R_7$ denotes hydrogen or $C_1$-$C_4$-alkyl and
r denotes an integer from 1-40;
phenyl which is optionally substituted by halogen, hydroxyl, $C_1C_{12}$-alkyl or $C_1$-$C_{12}$-alkoxy, pyridin-2-yl or phenyl-$C_1$-$C_4$-alkyl which is optionally substituted one phenyl nucleus by $C_1$-$C_4$-alkyl, $C_1$-$C_4$-alkoxy or halogen, or together denote, with the inclusion of the N atom, morpholinyl, piperidinyl or piperazinyl; and
$R_3$ denotes $C_1$-$C_{30}$-alkyl which is optionally substituted by hydroxyl, $C_1$-$C_4$-alkoxy, carboxyl or polyether groups of the formula

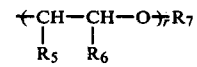

wherein
$R_5$ and $R_6$ denote hydrogen or methyl,
$R_7$ denotes hydrogen or $C_1$-$C_4$-alkyl and
r denotes an integer from 1–40;
phenyl-$C_1$-$C_4$-alkyl which is optionally substituted on the phenyl nucleus by $C_1$-$C_4$-alkyl, $C_1$-$C_4$-alkoxy or halogen, piperidin-2-yl or a radical of the formula

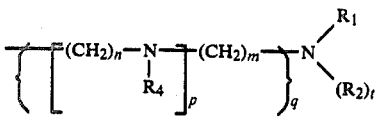

wherein
$R_5$ and $R_6$ denote hydrogen or methyl,
$R_7$ denotes hydrogen or $C_1$-$C_4$-alkyl and
r denotes an integer from 1–40;
subsituted $C_1$-$C_{30}$-alkyl or -alkenyl,
n denotes an integer from 1 to 3,
p denotes an integer from 0 to 8,
m denotes an integer from 1 to 4,
q denotes the integer 1 or 2 and
t denotes the integer 0 or 1,
the sum of q and t being 2; and
0 to 75% by weight of further formulating agents.

12. Dyestuff formulation according to claim 11, which contains 20–80% by weight of a dyestuff according to claim 11, 5–30% by weight of a compound of the formula

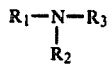

wherein
$R_1$ and $R_2$ denote hydrogen, optionally substituted alkyl, optionally substituted alkenyl, optionally substituted aryl, optionally substituted hetaryl or optionally substituted aralkyl, or together, with the inclusion of the N atom, denote a heterocyclic ring and $R_3$ denotes optionally substituted alkyl, optionally substituted aralkyl, optionally substituted hetaryl, optionally substituted aralkyl or a radical of the formula

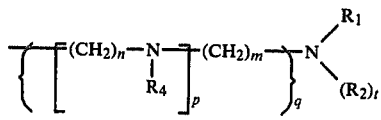

wherein
$R_1$ and $R_2$ have the abovementioned meaning,
$R_4$ denotes hydrogen, optionally substituted alkyl or optionally substituted alkenyl,
n denotes an integer from 1 to 3,
p denotes an integer from 0 to 8,
m denotes an integer from 1 to 4,
q denotes the integer 1 or 2 and
t denotes the integer 0 or 1,
the sum of qu and t being 2,
and 0–75% by weight of further formulating agents.

* * * * *